(12) United States Patent
Yang et al.

(10) Patent No.: US 8,264,982 B2
(45) Date of Patent: Sep. 11, 2012

(54) METHOD, APPARATUS AND SYSTEM FOR FORMING TIME DIVISION DUPLEX MULTI-INPUT MULTI-OUTPUT DOWNLINK BEAMS

(75) Inventors: Luxi Yang, Shenzhen (CN); Daofeng Xu, Shenzhen (CN); Yinggang Du, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 241 days.

(21) Appl. No.: 12/825,099

(22) Filed: Jun. 28, 2010

(65) Prior Publication Data
US 2010/0265843 A1 Oct. 21, 2010

Related U.S. Application Data

(63) Continuation of application No. PCT/CN2008/073762, filed on Dec. 26, 2008.

(30) Foreign Application Priority Data

Dec. 28, 2007 (CN) .......................... 2007 1 0306382

(51) Int. Cl.
*H04B 7/02* (2006.01)
*H04W 24/00* (2009.01)
*H04L 5/14* (2006.01)

(52) U.S. Cl. .......................... 370/252; 370/280; 375/267
(58) Field of Classification Search .................. 370/241, 370/252, 276, 277, 280; 375/259–262, 267
See application file for complete search history.

(56) References Cited

U.S. PATENT DOCUMENTS

| 7,813,458 | B2 | 10/2010 | van Waes et al. | |
|---|---|---|---|---|
| 8,107,544 | B2* | 1/2012 | Mondal et al. | 375/260 |
| 2005/0286663 | A1 | 12/2005 | Poon | |
| 2007/0058590 | A1 | 3/2007 | Wang et al. | |
| 2008/0037675 | A1* | 2/2008 | Lin et al. | 375/262 |
| 2008/0285667 | A1* | 11/2008 | Mondal et al. | 375/260 |
| 2012/0069925 | A1* | 3/2012 | Mondal et al. | 375/267 |

FOREIGN PATENT DOCUMENTS

| CN | 1885735 A | 12/2006 |
|---|---|---|
| CN | 1973473 A | 5/2007 |
| CN | 101043298 A | 9/2007 |

(Continued)

OTHER PUBLICATIONS

Chen, C-Y., et al., "Precoded FIR and Redundant V-BLAST Systems for Frequency-Selective MIMO Channels", IEEE Transactions on Signal Processing, vol. 55, No. 7, Jul. 2007, 15 pages.

(Continued)

*Primary Examiner* — Chi Pham
*Assistant Examiner* — Robert Lopata
(74) *Attorney, Agent, or Firm* — Slater & Matsil, L.L.P.

(57) ABSTRACT

In a method for forming TDD MIMO downlink beams, a BS receives an index of a codebook element from a mobile terminal. The codebook element refers to a codebook element whose correlation value has a greatest modulus value among correlation values that are calculated by the mobile terminal and are about correlation between the codebook element and a channel corresponding to a non-transmitting antenna of the mobile terminal. The BS calculates a channel vector corresponding to the non-transmitting antenna of the mobile terminal. The BS calculates channel vectors of the transmitting antennas of the mobile terminal, and performs SVD to determine a best transmitting precoding matrix.

10 Claims, 6 Drawing Sheets

FOREIGN PATENT DOCUMENTS

| | | |
|---|---|---|
| CN | 101047414 A | 10/2007 |
| WO | WO 2005/109677 A1 | 11/2005 |
| WO | WO2006/018710 A1 | 2/2006 |
| WO | WO 2006/138555 A2 | 12/2006 |
| WO | WO 2007/050860 A1 | 5/2007 |
| WO | WO2007/050860 A1 | 5/2007 |

OTHER PUBLICATIONS

Extended European Search Report, Application No. 08870619.7-2411/2237451, PCT/CN2008073762, Dated: Feb. 12, 2011.

Tomcik, J., "MBTDD Wideband Mode Performance Report 2 Presentation", IEEE C802.20-05/89r1, Dated Jan. 6, 2006, 31 Pages, San Diego, California.

International Search Report, Application No. PCT/CN2008/073701, 4 pages, Dated: Apr. 9, 2009.

Sälzer, T., "On Spatial Covariance Matrices for Downlink Eigen-Beamforming in Multi-Carrier CDMA", ICASSP 2005, 4 Pages.

Sharif, M., et al., "On the Capacity of MIMO Broadcast Channels With Partial Side Information",IEEE Transactions on Information Theory, vol. 51, No. 2, Feb. 2005, 17 Pages.

Van Den Bos, A., "The Multivariate Complex Normal Distribution—A Generalization", IEEE Transactionson Information Theory, vol. 41, No. 2, Mar. 1995, 3 Pages.

Written Opinion of the International Searching Authority, International Application No. PCT/CN2008/073701, Dated: Apr. 9, 2009, 3 Pages.

Xu, D., et al., "Feedback of Downlink Channel State Information Based on Superimposed Coding", IEEE Communications Letters, vol. 11, No. 3, Mar. 2007, 3 Pages.

Chinese Office Action and Partial Translation received in Chinese Patent Application No. 200710306382.0, mailed Feb. 21, 2012, 9 pages.

International Search Report, PCT/CN2008/073762, Date of mailing Mar. 26, 2009, 4 pages.

International Preliminary Report on Patentability, PCT/CN2008/073762, Date of issuance Jun. 29, 2010, 10 pages.

European Search Report, Application No. 08870656.9-1246, Huawei Technologies Co. Ltd., Jun. 27, 2012, 7 pages.

* cited by examiner

METHOD, APPARATUS AND SYSTEM FOR FORMING TIME DIVISION DUPLEX MULTI-INPUT MULTI-OUTPUT DOWNLINK BEAMS

This application is a continuation of co-pending International Application No. PCT/CN2008/073762, filed Dec. 26, 2008, which designated the United States and was not published in English, and which claims priority to Chinese Application No. 200710306382.0, filed Dec. 28, 2007, both of which applications are incorporated herein by reference.

TECHNICAL FIELD

The present invention relates to the field of communications technologies, and in particular, to a method, an apparatus, and a system for forming Time Division Duplex (TDD) Multi-Input Multi-Output (MIMO) downlink beams.

BACKGROUND

Studies show that the MIMO technology improves the multiplexing gain and diversity gain of a communications system significantly. Based on a Bell-labs Layered Space Time (BLAST) technology (which is a time-space communications technology patented by Bell Labs), different transmitting antennas transmit different data streams. In this case, the system capacity increases in proportion to the order of the MIMO channel. Based on a space-time coding and single-beam forming technology, all antennas transmit the same data stream to improve transmission reliability. The maximum diversity gain is equal to the product of the number of the transmitting antennas and the number of receiving antennas. Nevertheless, depending on the specific requirements on the rate and reliability, the MIMO system may be designed to utilize both multiplexing gain and diversity gain, namely, achieve a tradeoff between multiplexing and diversity.

In a Frequency Division Duplex (FDD) system, downlink channels are hardly available, and the downlink beam formation vector is generally calculated by a mobile terminal, and is selected from a codebook of a limited length. The serial number of the best codeword selected is fed back by the mobile terminal to a Base Station (BS) through a low-rate feedback channel. Such a method is generally known as limited feedback precoding.

Unlike FDD, a TDD system is characterized by reciprocity between downlink channels and uplink channels because uplinks and downlinks use the same frequency resource. That is, a downlink channel gain may be obtained through estimation of the uplink channel gain. Based on such channel information, multiple precoding technologies may be adopted. For example, Singular Value Decomposition (SVD), Zero Forcing (ZF), Minimum Mean Square Error (MMSE), Tomlinson-Harashima Precoding (THP), and Vector Precoding (VP). For a TDD MIMO system, the prerequisite of using the foregoing precoding technologies is that the mobile terminal needs to use all antennas to transmit signals, so that the BS obtain all information of the MIMO channel. However, due to power consumption of the power amplifier and complexity, currently the mobile terminal still uses a single antenna to upload signals although it can receive signals through multiple antennas. Therefore, by using the reciprocity, the BS obtains only Partial Channel State Information (PCSI) corresponding to one antenna of the mobile terminal. Evidently, the traditional precoding technology is not realizable on the basis of only such PCSI. In this case, the precoding technology needs to be implemented on the basis of PCSI and channel statistic information.

A precoding implementation method in the prior art is implemented in a TDD MIMO system through a Pseudo-Eigen Beam (PEB) forming technology. The conception of the precoding implementation method is to reconstruct a correlation matrix of the channel, and then select beams of multiple streams through SVD. The reconstructed relevant matrixes are made up of three weighted parts, namely, a correlation matrix which is made up of instantaneous PCSI on the BS side and has a rank of 1; a long-term channel correlation matrix fed back by the mobile terminal; and long-term statistics of unitary spaces which are selected randomly on the BS side and include instantaneous PCSI.

However, such a method involves feedback of long-term statistics from the mobile terminal, and requires SVD performed by the BS and the mobile terminal simultaneously in order to select the transmission mode. Meanwhile, the BS needs to maintain a random statistic, which is implemented through continuous Quadrature Right-triangle (QR) decompositions. Therefore, the implementation is rather complicated. Moreover, no best weight value is determined in the PEB forming technology, and an empiric weight value needs to be used in practice. Evidently, the PEB forming technology does not make full use of the precise PCSI, and the corresponding data stream rate is not ensured.

SUMMARY OF THE INVENTION

The embodiments of the present invention provide a method, an apparatus, and a system for forming TDD MIMO downlink beams to simplify implementation.

An embodiment of the present invention provides a method for forming TDD MIMO downlink beams. A base station (BS) receives an index of a codebook element from a mobile terminal. The codebook element refers to a codebook element whose correlation value has a greatest modulus value among correlation values that are calculated by the mobile terminal and are about correlation between the codebook element and a downlink channel corresponding to a transmitting antenna of the mobile terminal. A downlink channel vector corresponding to a non-transmitting antenna of the mobile terminal is calculated according to the index of the codebook element whose correlation value has the greatest modulus value. An uplink channel vector of the transmitting antenna of the mobile terminal is measured, and regarding the uplink channel vector as the downlink channel vector corresponding to the transmitting antenna of the mobile terminal according to uplink-downlink channel symmetry of a TDD system. Singular Value Decomposition (SVD) is performed using downlink channel vectors of antennas of the mobile terminal to determine a best transmitting precoding matrix. The downlink channel vectors of the antennas of the mobile terminal are composed of the downlink channel vector corresponding to the non-transmitting antenna of the mobile terminal and the downlink channel vector corresponding to the transmitting antenna of the mobile terminal.

An embodiment of the present invention provides a BS, where the BS includes a downlink channel vector calculating unit corresponding to transmitting antenna of a mobile terminal, a downlink channel vector calculating unit corresponding to non-transmitting antenna of the mobile terminal, and a unit for determining a best transmitting precoding matrix.

The downlink channel vector calculating unit corresponding to transmitting antenna of a mobile terminal is configured to measure an uplink channel vector of a transmitting antenna, and regard the uplink channel vector as a downlink channel vector corresponding to the transmitting antenna of the mobile terminal according to uplink-downlink channel symmetry of a TDD system.

The downlink channel vector calculating unit corresponding to non-transmitting antenna of the mobile terminal is configured to receive an index of a codebook element, where the codebook element refers to a codebook element whose correlation value has a greatest modulus value among correlation values that are calculated by the mobile terminal and are about correlation between the codebook element and a downlink channel corresponding to a non-transmitting antenna of the mobile terminal; and calculate a downlink channel vector corresponding to the non-transmitting antenna of the mobile terminal according to the index of the codebook element.

The unit for determining a best transmitting precoding matrix is configured to perform SVD by using downlink channel vectors of antennas of the mobile terminal to determine a best transmitting precoding matrix, where the downlink channel vectors of the antennas of the mobile terminal are composed of the downlink channel vector corresponding to the non-transmitting antenna of the mobile terminal and the downlink channel vector corresponding to the transmitting antenna of the mobile terminal.

A receiver is provided in an embodiment of the present invention to receive beams transmitted by the BS.

A communications system provided in an embodiment of the present invention includes a BS that is configured to receive an index of a codebook element, where the codebook element refers to a codebook element whose correlation value has a greatest modulus value among correlation values that are calculated by a receiver and are about correlation between the codebook element and a downlink channel corresponding to a non-transmitting antenna of the receiver; calculate a downlink channel vector corresponding to the non-transmitting antenna of the receiver according to the index of the codebook element; obtain a downlink channel vector corresponding to a transmitting antenna of the receiver according to the uplink-downlink channel symmetry of a Time Division Duplex (TDD) system, make up channel vectors of antennas of the receiver by using the downlink channel vector corresponding to the transmitting antenna of the receiver and the calculated downlink channel vector corresponding to the non-transmitting antenna of the receiver; perform SVD for the channel vectors of the antennas of the receiver to determine a best transmitting precoding matrix. The system also includes a receiver that is configured to receive beams transmitted by the BS.

In embodiments of the present invention, the BS receives an index of a codebook element, where the codebook element refers to a codebook element whose correlation value has a greatest modulus value among correlation values that are calculated by the mobile terminal and are about correlation between the codebook element and a channel corresponding to a transmitting antenna of the mobile terminal. The BS calculates a channel vector corresponding to the transmitting antenna of the mobile terminal according to the index of the codebook element whose correlation value has the greatest modulus value. The BS measures an uplink channel vector of the transmitting antenna of the mobile terminal, and regards the uplink channel vector as the downlink channel vector corresponding to the transmitting antenna of the mobile terminal according to uplink-downlink channel symmetry of a TDD system. The BS performs SVD by using downlink channel vectors of antennas of the mobile terminal to determine a best transmitting precoding matrix. Embodiments of the present invention avoid feedback of long-term channel statistics from the mobile terminal to the BS, and simplify the calculation.

BRIEF DESCRIPTION OF THE DRAWINGS

To make the technical solution in the present invention or in the prior art clearer, the following outlines the accompanying drawings for illustrating the embodiments of the present invention or the prior art. Apparently, the accompanying drawings outlined below are for the exemplary purpose only, and persons of ordinary skill in the art can derive other drawings from such accompanying drawings without creative effort.

DETAILED DESCRIPTION OF ILLUSTRATIVE EMBODIMENTS

The embodiments of the present invention are elaborated below with reference to accompanying drawings.

In the embodiments of the present invention, in the case of limited feedback, the direction of the channel vector corresponding to the transmitting antenna of the mobile terminal is estimated through a Constraint Maximum Likelihood (CML) estimation method, and the estimated channel vector direction is used for performing SVD to determine the best transmitting precoding matrix.

Figure 1:
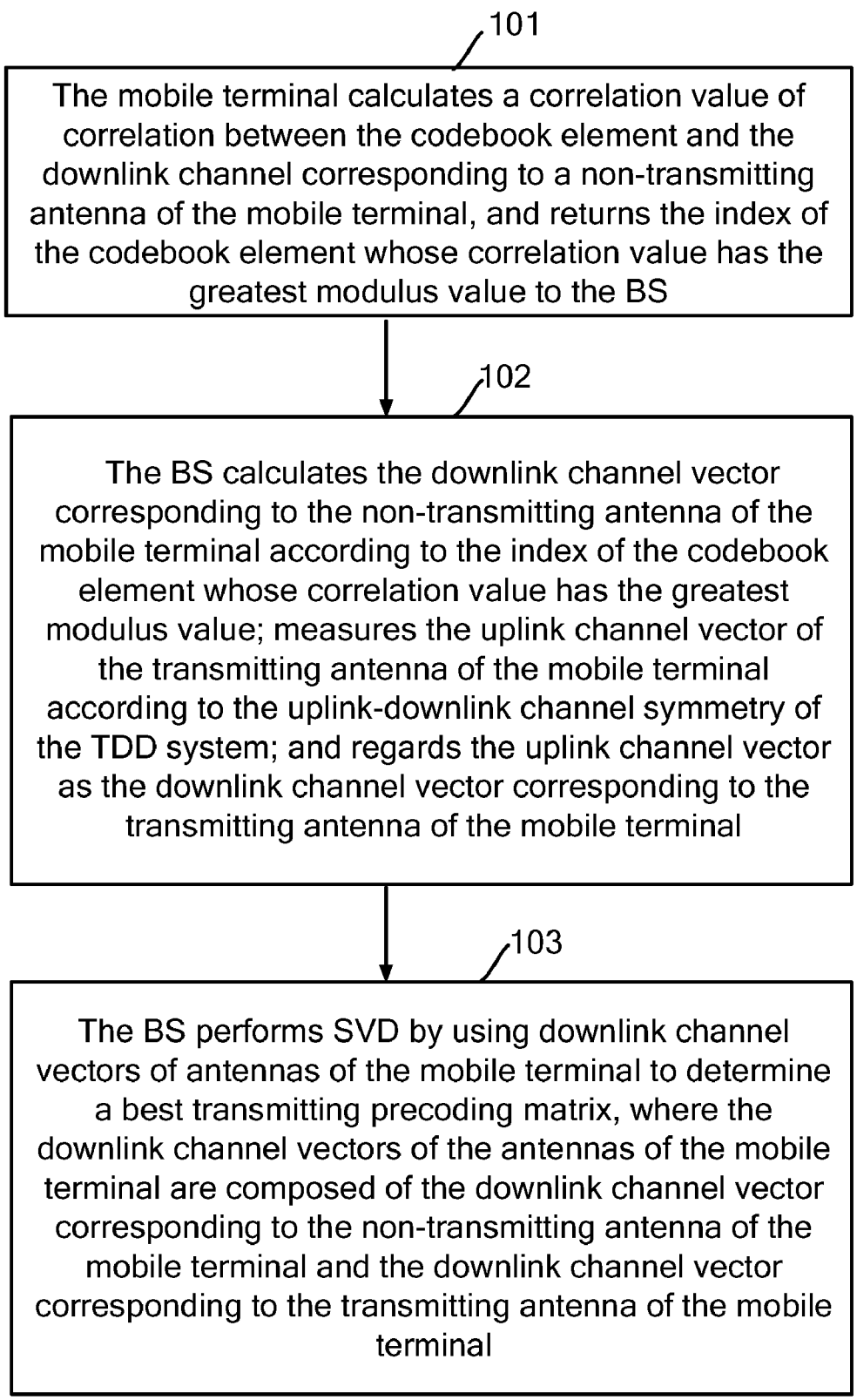
FIG. 1 is a flowchart of a method for generating TDD MIMO downlink beams in an embodiment of the present invention.

FIG. 1 is a flowchart of a method for generating TDD MIMO downlink beams in an embodiment of the present invention. The method includes the following steps.

Step 101: The mobile terminal calculates a correlation value of correlation between the codebook element and the downlink channel corresponding to a non-transmitting antenna of the mobile terminal, and returns the index of the codebook element whose correlation value has the greatest modulus value to the BS.

A codebook may be maintained on the mobile terminal and the BS simultaneously, and the length of the codebook is equal to the number of transmitting antennas of the BS.

Step 102: The BS calculates the downlink channel vector corresponding to the non-transmitting antenna of the mobile terminal according to the index of the codebook element whose correlation value has the greatest modulus value; measures the uplink channel vector of the transmitting antenna of the mobile terminal; and regards the uplink channel vector as the downlink channel vector corresponding to the transmitting antenna of the mobile terminal according to the uplink-downlink channel symmetry of the TDD system.

Here the BS may calculate the channel vector of the non-transmitting antenna of the mobile terminal through a CML estimation method.

Step 103: The BS performs SVD by using downlink channel vectors of antennas of the mobile terminal to determine a best transmitting precoding matrix, where the downlink channel vectors of the antennas of the mobile terminal are composed of the downlink channel vector corresponding to the non-transmitting antenna of the mobile terminal and the downlink channel vector corresponding to the transmitting antenna of the mobile terminal.

The calculation method involved in the embodiments of the present invention is elaborated below.

First, a system model provided in an embodiment of the present invention is described below. The following single-user MIMO system model is applicable.

It is assumed that the number of antennas of the BS is M, the number of antennas of the mobile terminal is N (without loss of generality, it is assumed that N=2), and M≧N. The mobile terminal receives data through all antennas, but uploads data through one of the antennas. According to channel reciprocity, the BS can obtain downlink channel information corresponding to the uploading antenna of the mobile terminal.

It is assumed that the BS multiplexes $N_S$ streams simultaneously and delivers the streams to the user. The streams pass through a beam forming matrix (precoding matrix) W first, and are then transmitted out through all antennas. The corresponding baseband input-output relation may be expressed as:

$$Y = \sqrt{\frac{E_s}{N_s}} HWS + n = \sqrt{\frac{E_s}{N_s}} \bar{H}S + n. \tag{1}$$

In the equation above, $E_S$ is the total transmitting power, n is additive white Gaussian noise, which obeys $N(0, \sigma_n^2)$, and $\bar{H}$=HW. The precoding matrix fulfills constraint trace($WW^H$)=$N_S$, where Y is a received signal and S is a transmitted signal.

The correlation between MIMO channels is generally expressed by a Kronecker product as follows:

$$H = R_r^{1/2} H_w R_t^{1/2} \tag{2}$$

In the equation above, $R_t$ is a transmitter-side correlation matrix of M×M, $R_r$ is a receiver-side correlation matrix of N×N; and $H_w$ is a space-independent MIMO channel of N×M. Generally it is assumed that every element of it obeys normal Gaussian distribution N(0,1).

Because a mobile terminal is generally located in an environment abundant in scatterers, the mobile terminal may be regarded as free of correlation; because few scatterers exist around a BS, the correlation of the BS is generally not ignorable.

Based on the analysis above, an actual MIMO system may be approximately represented by the following simplified correlation model:

$$H = H_w R_t^{1/2} = (h_1 h_2 \ldots h_N)^H. \tag{3}$$

In the equation above, $h_i$ is a channel vector between antenna i of the mobile terminal and multiple antennas of the BS.

$R_t$ is generally represented by the following correlation coefficient matrix approximately:

$$R_t = \begin{pmatrix} 1 & \rho & \cdots & \rho^{M-1} \\ \rho^* & 1 & \cdots & \rho^{M-2} \\ \vdots & \vdots & \ddots & \vdots \\ (\rho^*)^{M-1} & (\rho^*)^{M-2} & \cdots & 1 \end{pmatrix}. \tag{4}$$

In the equation above, ρ is a correlation coefficient between neighboring antennas.

The correlation matrix between transmitting antennas above actually depends on the system carrier, arrangement of BS antennas, and distance between antennas. The correlation matrix may be obtained through BS-side calculation, or may be obtained by the mobile terminal through long-term statistics and fed back to the BS. In this embodiment, it is assumed that the correlation matrix determined by equation (4) can be obtained through BS-side long-term statistics on the transmitter side.

Based on the limited feedback conception in the FDD system, according to the embodiments of the present invention, limited bits are fed back from the mobile terminal to describe the information about the channel corresponding to the second antenna; on the BS side, the vector of this channel is estimated through CML estimation, and SVD is performed according to the estimated channel vector and the channel vector obtained through reciprocity to determine the transmitting beam. In this case, a water-filling algorithm may be applied to improve the accomplishable rate of the system.

Without loss of generality, it is assumed that the mobile terminal has two antennas.

In the beam forming algorithm with limited feedback, the feedback information is determined in the following way.

First, the channel vector corresponding to one antenna of the mobile terminal is correlated with the channel vector corresponding to the other antenna of the mobile terminal, and a correlation coefficient is fed back, namely:

$$\gamma_1 = |h_2^H h_1|^2 / |h_1|^2 \tag{5}$$

or $$\gamma_2 = h_2^H h_1 / |h_1|. \tag{6}$$

Because the mobile terminal is in an environment abundant in scatterers, it is deemed that no correlation exists between the channel vectors corresponding to the two antennas. Therefore, the feedback values obtained in equation (5) and equation (6) are distributed around 0 in a statistic sense. Because the modulus value of the feedback quantity is too small, the performance obtained in light of the CML estimation is not as good as expected.

In another feedback solution, a codebook is maintained on the receiver side and the transmitter side simultaneously, the correlation value of correlation between the codebook element and the channel corresponding to the second antenna is calculated, and the index of the codebook element which has the greatest modulus value is fed back. It is assumed that the codebook length is equal to the number of transmitting antennas of the BS (M=4). The codebook may be a complete orthogonal basis in any 4-dimensional unitary space. The column vector corresponding to any 4-dimensional unitary matrix selected randomly can serve as a codebook.

Taking the foregoing into account, the feedback quantity in a limited feedback solution based on codebooks is designed as:

$$\gamma_3 = \underset{i=1,\ldots,M}{\operatorname{argmax}} |h_2^H c_i|^2 \qquad (7)$$

and $$\gamma_4 = \underset{i=1,\ldots,M}{\max} |h_2^H c_i|^2. \qquad (8)$$

In the equation above, $C=[c_1 c_2 \ldots c_M]$ is an orthogonal random codebook whose length is M, the feedback quantity $\gamma_3$ is the index of the codebook, and $\gamma_4$ is the maximum correlation coefficient.

As regards CML, under the relevant channel model determined by equation (3), the channel vector $h_i$ between the BS and any antenna of the mobile terminal obeys multi-variable complex Gaussian distribution $N(0, R_t)$, namely, its probability density function is:

$$f_h(h_i) = \frac{1}{\pi^M |R_t|} e^{-h_i^H R_t^{-1} h_i}. \qquad (9)$$

Therefore, under constraint (5) or (8), the maximum likelihood estimation of $h_2$ is equivalent to the following optimization:

$$\max h_2^H R_t h_2, \text{ s.t. } \gamma_1 = |h_2^H h_1|^2 / |h_1|^2, \qquad (10)$$
$$\text{or } \gamma_4 = \underset{i=1,\ldots,M}{\max} |h_2^H c_i|^2.$$

The best solution to the equation above can be converted to a generalized eigenvalue, namely:

$$\hat{h}_2 = \underset{h}{\operatorname{argmax}} \frac{h^H R_t h}{h^H h_1 h_1^H h}, \text{ or } \hat{h}_2 = \underset{h}{\operatorname{argmax}} \frac{h^H R_t h}{h^H c_{max} c_{max}^H h}. \qquad (11)$$

In the equation above, $c_{max}$ is a codeword that matches $h_2$ best.

It is assumed that $\phi = h_1 h_1^H$ (or $\phi = c_{max} c_{max}^H$), and the generalized eigenvalue vector corresponding to the maximum positive generalized eigenvalue of the matrix relative to ($R_t$, $\phi$) is u. Taking the channel modulus value into account, $h_2$ is estimated as:

$$\hat{h}_2 = ku \qquad (12)$$

In the equation above, $$k = \frac{\sqrt{\gamma_1} |h_1|}{|u^H h_1|} \left( \text{or } k = \frac{\sqrt{\gamma_4}}{|u^H c_{max}|} \right)$$

is a coefficient that fulfills $h_2$ modulus value constraint.

In this way, the channel vector corresponding to the non-transmitting antenna of the mobile terminal is estimated through CML estimation. The estimation covers not only the direction of the channel vector, but also the modulus value of the channel vector. With the restructured channel, the mobile terminal can perform SVD and power water-filling to determine the best transmitting precoding matrix. The modulus value of the correlation coefficient needs to be fed back in both the limited feedback solution based on codebooks and the feedback solution based on correlation of two channel vectors. Undoubtedly, feedback of a real-number variable involves great feedback.

In fact, in order to prevent precoding from affecting the transmission rate of the system, the precoding matrix should be in the space formed by the right singular vectors corresponding to the two non-zero singular values of the channel vector. Therefore, as long as this space is found, any base in the space fulfills the rate-lossless transmission requirement.

Lemma 1: It is assumed that $$H_1 = \begin{pmatrix} h_1^H \\ h_2^H \end{pmatrix} \in C^{2 \times M} \text{ and } H_2 = \begin{pmatrix} h_1^H \\ \alpha h_2^H \end{pmatrix},$$

where $\alpha \in C$, $$\text{if } H_1 = U_1 (D_1 \ 0) \begin{pmatrix} V_{11}^H \\ V_{12}^H \end{pmatrix} \text{ and } H_2 = U_2 (D_2 \ 0) \begin{pmatrix} V_{21}^H \\ V_{22}^H \end{pmatrix},$$

$\operatorname{span}(V_{11}) = \operatorname{span}(V_{21})$ and $\operatorname{span}(V_{12}) = \operatorname{span}(V_{22})$.

Proof: Decompose $H_1$ into a compact form $H_1 = U_1 D_1 V_{11}^H$ through SVD, because $U_1 D_1$ is a full-rank matrix:

$$\operatorname{span}(H_1^H) = \operatorname{span}(V_{11}) \qquad (13)$$

By analogy:

$$\operatorname{span}(H_2^H) = \operatorname{span}(V_{21}). \qquad (14)$$

According to the form of $H_1$ and $H_2$, the following equation is deduced:

$$\operatorname{span}(H_1^H) = \operatorname{span}(H_2^H). \qquad (15)$$

Equations (23)-(25) are used to deduce: $\operatorname{span}(V_{11}) = \operatorname{span}(V_{21})$.

Considering that $V_{12}^H$ and $V_{22}^H$ are complete orthogonal complements of $V_{11}^H$ and $V_{21}^H$ respectively, $\operatorname{span}(V_{12}) = \operatorname{span}(V_{22})$.

Lemma 1 shows that, without considering power water-filling, the estimation of channel vector modulus value makes no sense. Therefore, in the feedback solution based on codebooks, it is necessary only to feed back the most correlated codebook index.

Considering the maximum likelihood estimation equation (9), in order to maximize $h_2^H R_t h_2$, the eigenvector of the transmitting correlation matrix $R_t$ is used as a codebook. In this case, the accomplishable maximum value is the maximum eigenvalue of $R_t$. By using the correlation feature of the channel, the method based on EVD of the correlation matrix maximizes the correlation value of correlation between the channel vector and the codebook element in a statistic sense.

Generally, the rank for implementing H of the channel is 2, which is the number of receiving antennas. Therefore, the eigenvectors corresponding to the two maximum eigenvalues of $R_t$ may be used as codebooks. In this case, the feedback quantity is only 1 bit, and the performance loss is small.

It should be noted that, when the codebook employs the eigenvector of the transmitting correlation matrix, the CML estimation is redundant because the channel vector direction obtained through CML is the same as the direction of the codebook element in this case. Therefore, the calculation on the transmitter side is simplified.

The foregoing embodiment deals with the scenario that the mobile terminal has two antennas. In fact, the embodiments of the present invention are applicable to the scenario that the mobile terminal has more than two antennas. In this case, the transmitting antennas of the mobile terminal can transmit signals in turn. The embodiments of the present invention are further applicable to the scenario that some antennas of the mobile terminal transmit signals but other antennas do not transmit signals in the case of uplink transmitting.

The following gives downlink emulation performance in a MIMO system under different correlation coefficients, supposing that the BS has four antennas and the mobile terminal has two antennas. In all emulations, it is assumed that the mobile terminal transmits signals through a single antenna, and the downlink channel takes on a block fading feature. That is, the channel is steady in one data frame, but changes to another state independently in the next data frame.

Figure 2:
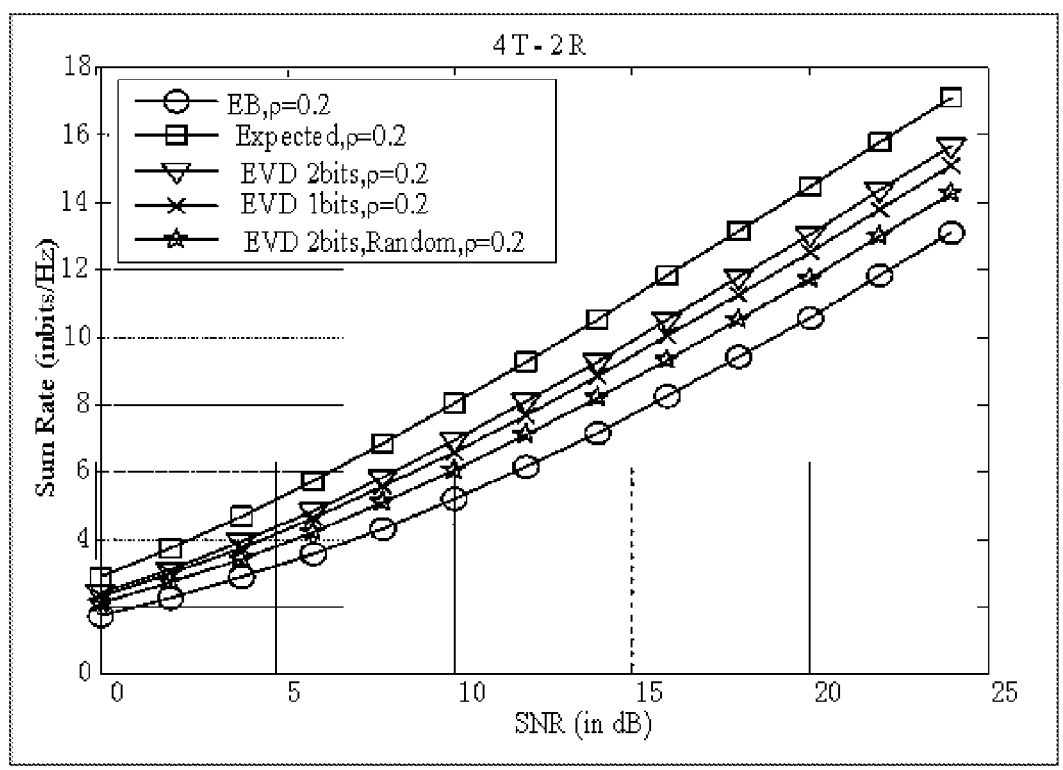
FIG. 2 shows emulated comparison of Signal-to-Noise Ratio (SNR) and sum rate in the case of $\rho=0.2$ with feedback in an embodiment of the present invention.
Figure 3:
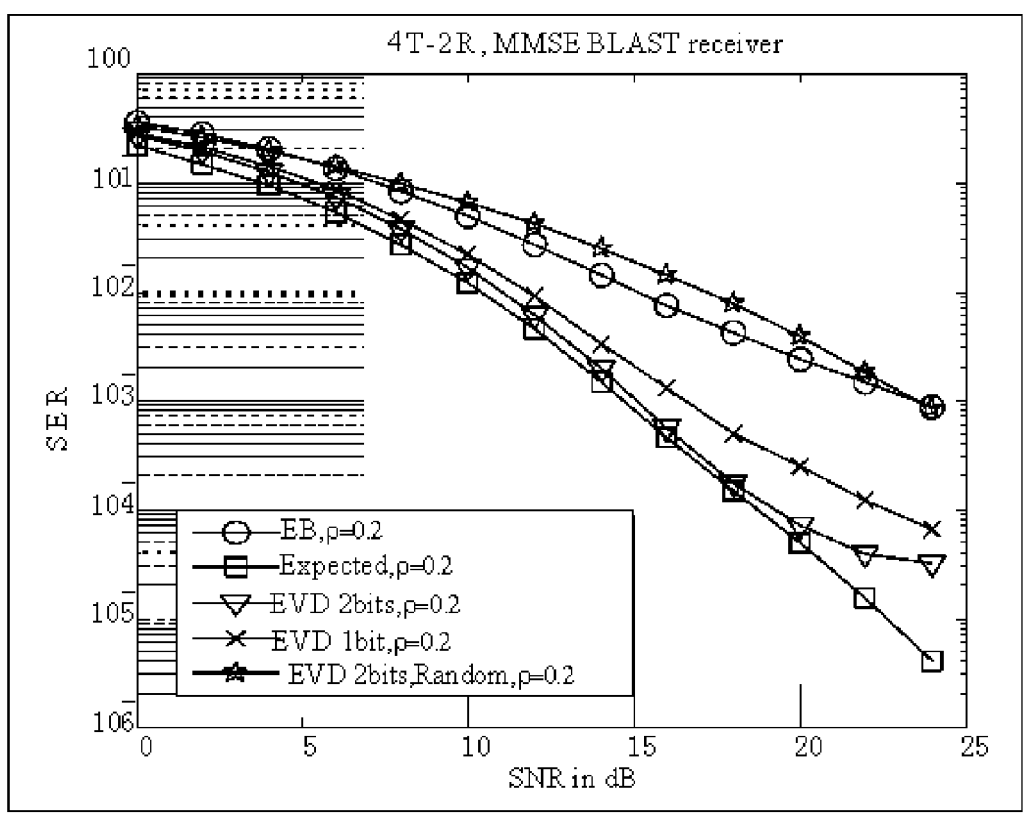
FIG. 3 shows emulated comparison of SNR and SER in the case of $\rho=0.2$ with feedback in an embodiment of the present invention.
Figure 4:
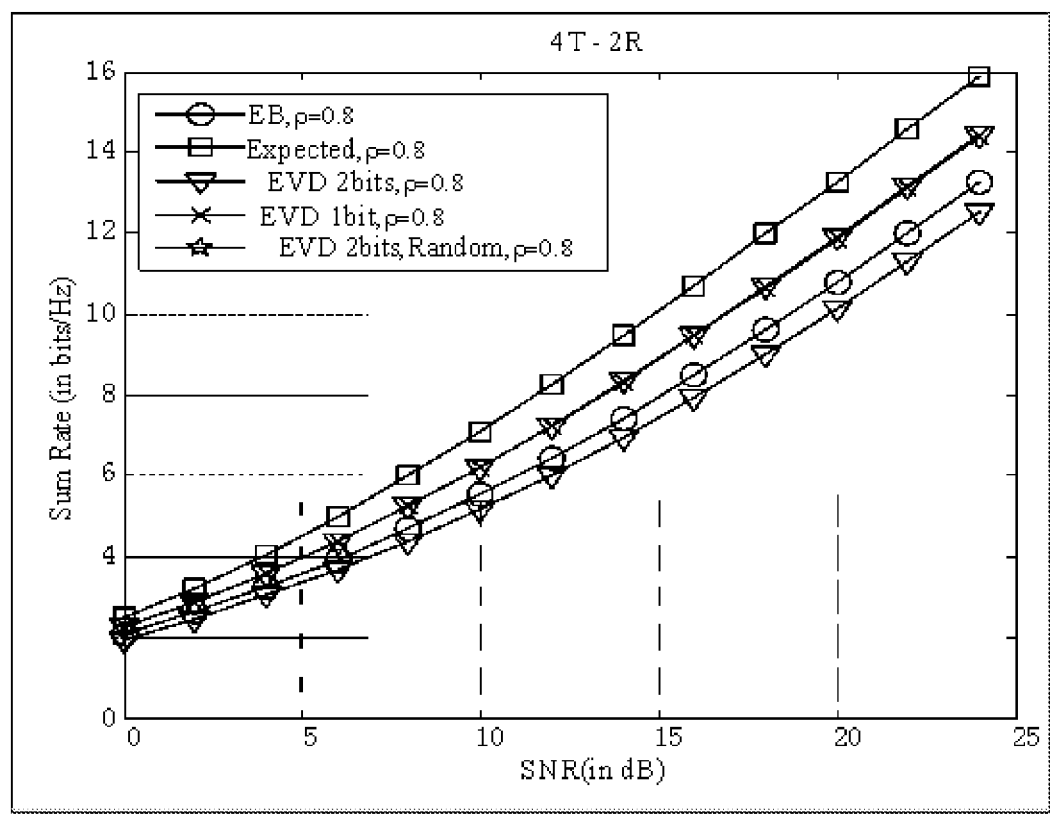
FIG. 4 shows emulated comparison of SNR and sum rate in the case of $\rho=0.8$ with feedback in an embodiment of the present invention.
Figure 5:
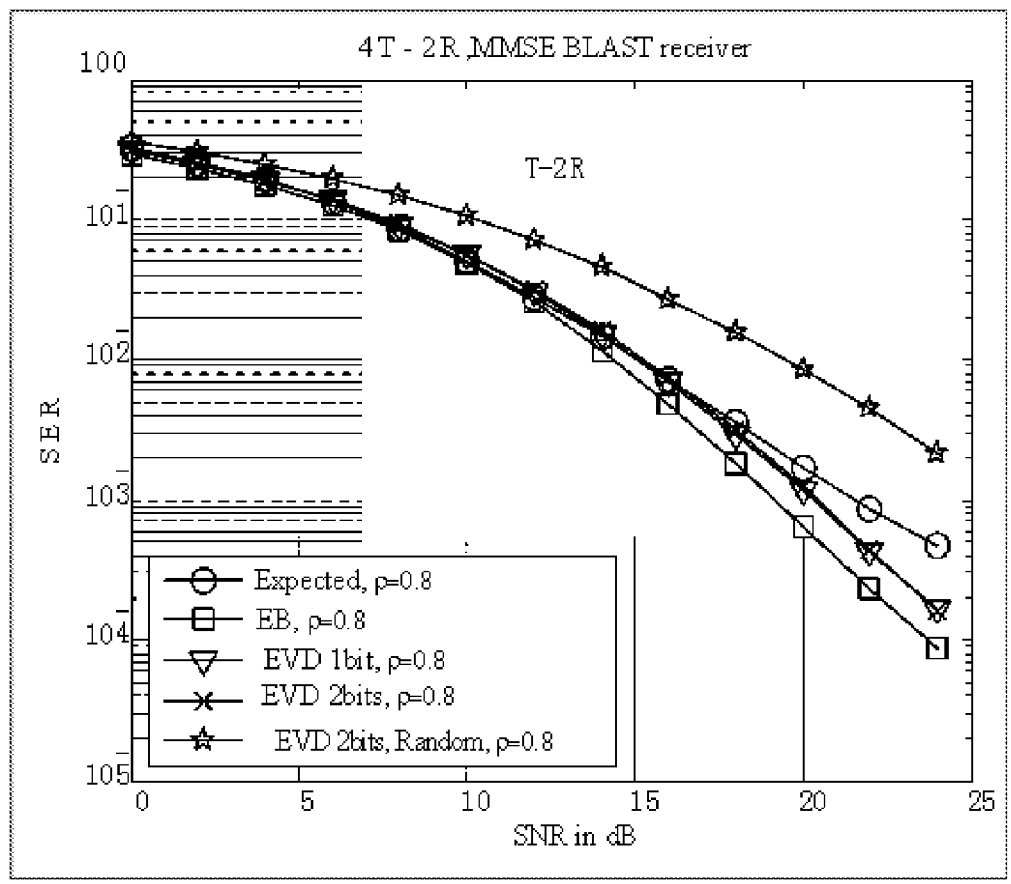
FIG. 5 shows emulated comparison of SNR and SER in the case of $\rho=0.8$ with feedback in an embodiment of the present invention.

FIG. 2 shows emulated comparison of SNR and sum rate in the case of ρ=0.2 with feedback in an embodiment of the present invention. FIG. 3 shows emulated comparison of SNR and SER in the case of ρ=0.2 with feedback in an embodiment of the present invention. FIG. 4 shows emulated comparison of SNR and sum rate in the case of ρ=0.8 with feedback in an embodiment of the present invention. FIG. 5 shows emulated comparison of SNR and SER in the case of ρ=0.8 without feedback in an embodiment of the present invention.

As regards the beam forming algorithm with feedback, the codebook of limited feedback employs the eigenvector of the transmitter-side correlation matrix and the random orthogonal matrix respectively. In order to accomplish the best bit error rate performance, the mobile terminal here is an MMSE-BLAST receiver, and the accomplishable rate is calculated still through equations (12)-(14). As a comparison, FIG. 2-FIG. 5 illustrate the eigen beam forming calculation based on EVD of the transmitter-side correlation matrix, and the beam forming method based on SVD in which the instantaneous complete Channel State Information (CSI) is known.

FIG. 2-FIG. 5 illustrate the performance with the correlation coefficient ρ=0.2 and ρ=0.8. The emulation curve shows that, if the feedback quantity is 2 bits, the feedback solution based on the random orthogonal codebook brings the worst performance because the random orthogonal codebook whose length is 4 is not enough to render the distribution of channel vectors. When the correlation efficient of the antenna on the transmitter is great (ρ=0.8), in the solution which performs EVD for the transmitting correlation matrix to obtain the codebook, the performance in the case of 1-bit feedback is similar to the performance in the case of 2-bit feedback. With the decrease of the correlation coefficient, the performance in the case of 1-bit feedback decreases slightly but the decrease of feedback quantity brings no great performance loss.

In the embodiment of the present invention, in the case of limited feedback, the direction of the channel vector corresponding to the non-transmitting antenna of the mobile terminal is estimated through a CML estimation method, and the estimated channel vector direction is used for performing SVD to determine the best transmitting precoding matrix, without requiring feedback of long-term channel statistics from the mobile terminal to the BS, thus simplifying the operation.

Moreover, the direction of the channel vector corresponding to the non-transmitting antenna of the mobile terminal is estimated through CML estimation, the estimated channel vector combines with the downlink channel vector corresponding to the transmitting antenna of the mobile terminal into channel vectors corresponding to antennas of the mobile terminal, and the space formed by the right singular vectors corresponding to the nonzero singular values of the channel matrix is found. Therefore, the performance reaches or approaches the performance accomplished when the complete CSI is fed back.

Figure 6:
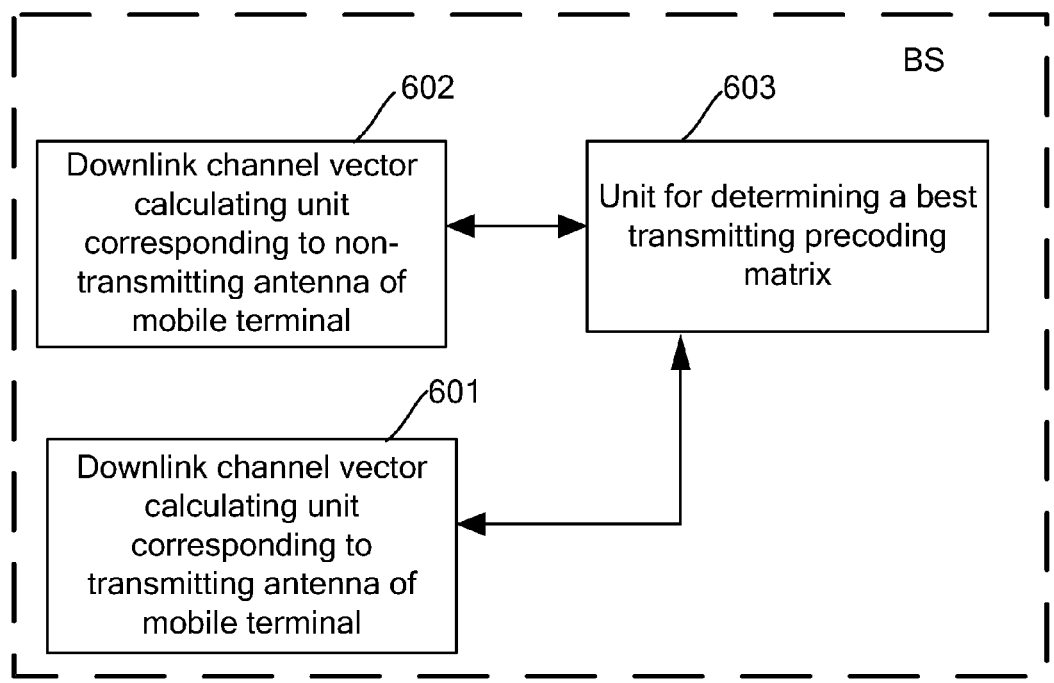
FIG. 6 shows a structure of a BS provided in an embodiment of the present invention.

FIG. 6 shows a structure of a BS provided in an embodiment of the present invention.

As shown in FIG. 6, the BS includes a downlink channel vector calculating unit 601 corresponding to transmitting antenna of a mobile terminal, a downlink channel vector calculating unit 602 corresponding to non-transmitting antenna of the mobile terminal, and a unit 603 for determining a best transmitting precoding matrix.

The downlink channel vector calculating unit 601 corresponding to transmitting antenna of a mobile terminal is configured to measure an uplink channel vector of a transmitting antenna, and regard the uplink channel vector as a downlink channel vector corresponding to the transmitting antenna of the mobile terminal according to uplink-downlink channel symmetry of a TDD system.

The downlink channel vector calculating unit 602 corresponding to non-transmitting antenna of the mobile terminal is configured to receive an index of a codebook element, where the codebook element refers to a codebook element whose correlation value has a greatest modulus value among correlation values that are calculated by the mobile terminal and are about correlation between the codebook element and a downlink channel corresponding to a non-transmitting antenna of the mobile terminal; and calculate a downlink channel vector corresponding to the non-transmitting antenna of the mobile terminal according to the index of the codebook element.

The unit 603 for determining a best transmitting precoding matrix is configured to perform SVD by using downlink channel vectors of antennas of the mobile terminal to determine a best transmitting precoding matrix, where the downlink channel vectors of the antennas of the mobile terminal are composed of the downlink channel vector corresponding to the non-transmitting antenna of the mobile terminal and the downlink channel vector corresponding to the transmitting antenna of the mobile terminal.

Preferably, the downlink channel vector calculating unit 601 corresponding to transmitting antennas of a mobile terminal is further configured to calculate the channel vector of the downlink channel corresponding to non-transmitting antenna of the mobile terminal through CML estimation.

A receiver provided in an embodiment of the present invention receives beams transmitted by the foregoing BS.

A TDD communication system is provided in an embodiment of the present invention.

Figure 7:
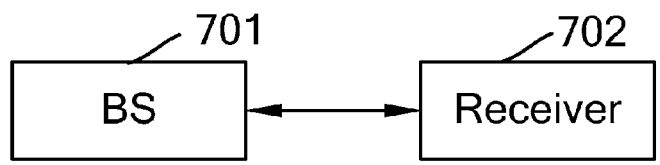
FIG. 7 shows a structure of a TDD communications system provided in an embodiment of the present invention.

FIG. 7 shows a structure of a TDD communication system provided in an embodiment of the present invention.

As shown in FIG. 7, the system includes a BS 701 that is configured to receive an index of a codebook element, where the codebook element refers to a codebook element whose correlation value has a greatest modulus value among correlation values that are calculated by the receiver 702 and are about correlation between the codebook element and a downlink channel corresponding to a non-transmitting antenna of the receiver; calculate a downlink channel vector corresponding to the non-transmitting antenna of the receiver according to the index of the codebook element; obtain a downlink channel vector corresponding to a transmitting antenna of the receiver according to the uplink-downlink channel symmetry of a Time Division Duplex (TDD) system, make up channel vectors of antennas of the receiver by using the downlink channel vector corresponding to the transmitting antenna of the receiver and the calculated downlink channel vector corresponding to the non-transmitting antenna of the receiver; perform SVD for the channel vectors of the antennas of the receiver to determine a best transmitting precoding matrix A receiver 702 is configured to receive beams transmitted by the BS.Preferably, the receiver is an MMSE-BLAST receiver.

Likewise, the BS 701 may include a downlink channel vector calculating unit corresponding to transmitting antenna of the receiver, a downlink channel vector calculating unit corresponding to non-transmitting antenna of the receiver, and a unit for determining a best transmitting preco ding matrix.

The downlink channel vector calculating unit corresponding to transmitting antenna of a receiver is configured to measure an uplink channel vector from a transmitting antenna of the receiver to the BS, and regard the uplink channel vector as a downlink channel vector corresponding to the transmitting antenna of the receiver according to uplink-downlink channel symmetry of a TDD system.

The downlink channel vector calculating unit corresponding to non-transmitting antenna of the receiver is configured to receive an index of a codebook element, where the codebook element refers to a codebook element whose correlation value has a greatest modulus value among correlation values that are calculated by the receiver and are about correlation between the codebook element and a downlink channel corresponding to a non-transmitting antenna of the receiver; and calculate a downlink channel vector corresponding to the non-transmitting antenna of the receiver according to the index of the codebook element.

The unit for determining a best transmitting precoding matrix is configured to perform SVD by using downlink channel vectors of antennas of the receiver to determine a best transmitting precoding matrix, where the downlink channel vectors of the antennas of the receiver are composed of the downlink channel vector corresponding to non-transmitting antenna of the receiver and the downlink channel vector corresponding to transmitting antenna of the receiver.

In conclusion, in the embodiments of the present invention, with feedback information of 1-2 bits, the direction of the channel vector corresponding to the second antenna of the mobile terminal is estimated through CML estimation, and the estimated channel vector combines with the downlink channel vector corresponding to the transmitting antenna of the mobile terminal into channel vectors corresponding to antennas of the mobile terminal; and the space formed by the right singular vectors corresponding to the nonzero singular values of this channel matrix is found. A base in this space is selected as the beam forming vector. The emulation result shows that the foregoing calculation method accomplishes or approaches the performance brought by complete CSI.

In the embodiment of the present invention, in the case of limited feedback, the direction of the channel vector corresponding to the non-transmitting antenna of the mobile terminal is estimated through a CML estimation method, and the estimated channel vector direction is used for performing SVD to determine the best transmitting precoding matrix, without requiring feedback of long-term channel statistics from the mobile terminal to the BS, thus simplifying the operation.

Moreover, the direction of the channel vector corresponding to the non-transmitting antenna of the mobile terminal is estimated through CML estimation, and the estimated channel vector combines with the downlink channel vector corresponding to the transmitting antenna of the mobile terminal into channel vectors corresponding to antennas of the mobile terminal; and the space formed by the right singular vectors corresponding to the nonzero singular values of the channel matrix is found. Therefore, the performance reaches or approaches the performance accomplished when the complete CSI is fed back.

Persons of ordinary skilled in the art should understand that all or part of the steps of the method under the present invention may be implemented by a program instructing relevant hardware. The program may be stored in a computer readable storage medium. When the program runs, the steps of the method under the present invention are performed. The storage media may be a magnetic disk, CD-ROM, Read-Only Memory (ROM), or Random Access Memory (RAM).

The above descriptions are merely some exemplary embodiments of the present invention, but not intended to limit the scope of the present invention. Any modification, equivalent replacement, or improvement made without departing from the spirit and principle of the present invention should fall within the scope of the present invention.

What is claimed is:

1. A method for forming Time Division Duplex (TDD) Multi-Input Multi-Output (MIMO) downlink beams, the method comprising:

receiving an index of a codebook element from a mobile terminal at a Base Station (BS), wherein the codebook element refers to a codebook element whose correlation value has a greatest modulus value among correlation values that are calculated by the mobile terminal and are about correlation between the codebook element and a downlink channel corresponding to a non-transmitting antenna of the mobile terminal;

calculating a downlink channel vector corresponding to the non-transmitting antenna of the mobile terminal according to the index of the codebook element whose correlation value has the greatest modulus value;

measuring an uplink channel vector of a transmitting antenna of the mobile terminal, and regarding the uplink channel vector as the downlink channel vector corresponding to the transmitting antenna of the mobile terminal according to uplink-downlink channel symmetry of a TDD system; and performing Singular Value Decomposition (SVD) by using downlink channel vectors of antennas of the mobile terminal to determine a best transmitting precoding matrix, wherein the downlink channel vectors of the antennas of the mobile terminal are composed of the downlink channel vector corresponding to the non-transmitting antenna of the mobile terminal and the downlink channel vector corresponding to the transmitting antenna of the mobile terminal.

2. The method according to claim 1, wherein the same codebook is maintained on the mobile terminal and the BS simultaneously, and a length of the codebook is equal to a number of transmitting antennas of the BS.

3. The method according to claim 2, wherein the codebook is composed of N maximum eigenvalues of a correlation matrix of the antennas of the BS, wherein N is the number of antennas of the mobile terminal.

4. The method according to claim 1, wherein calculating a downlink channel vector comprises calculating, by the BS, the downlink channel vector corresponding to the non-transmitting antenna of the mobile terminal through a Constraint Maximum Likelihood (CML) estimation method.

5. A base station, comprising:

a first downlink channel vector calculating unit corresponding to transmitting antenna of a mobile terminal, the first downlink channel vector calculating unit configured to measure an uplink channel vector of a transmitting antenna, and regard the uplink channel vector as a downlink channel vector corresponding to the transmitting antenna of the mobile terminal according to uplink-downlink channel symmetry of a Time Division Duplex (TDD) system;

a second downlink channel vector calculating unit corresponding to non-transmitting antenna of the mobile terminal, the second downlink channel vector calculating unit configured to receive an index of a codebook element, wherein the codebook element refers to a codebook element whose correlation value has a greatest modulus value among correlation values that are calculated by the mobile terminal and are about correlation between the codebook element and a downlink channel corresponding to a non-transmitting antenna of the mobile terminal; and calculate a downlink channel vector corresponding to the non-transmitting antenna of the mobile terminal according to the index of the codebook element; and a unit for determining a best transmitting precoding matrix, configured to perform Singular Value Decomposition (SVD) by using downlink channel vectors of antennas of the mobile terminal to determine a best transmitting precoding matrix, wherein the downlink channel vectors of the antennas of the mobile terminal are composed of the downlink channel vector corresponding to the non-transmitting antenna of the mobile terminal and the downlink channel vector corresponding to the transmitting antenna of the mobile terminal.

6. The base station of claim 5, wherein the first downlink channel vector calculating unit is further configured to calculate the downlink channel vector corresponding to the non-transmitting antenna of the mobile terminal through a Constraint Maximum Likelihood (CML) estimation method.

7. A communication system, comprising:
a base station; and
a receiver configured to receive beams transmitted by the base station;
wherein the base station is configured to:
receive an index of a codebook element, wherein the codebook element refers to a codebook element whose correlation value has a greatest modulus value among correlation values that are calculated by the receiver and are about correlation between the codebook element and a downlink channel corresponding to a non-transmitting antenna of the receiver;
calculate a downlink channel vector corresponding to the non-transmitting antenna of the receiver according to the index of the codebook element;
obtain a downlink channel vector corresponding to a transmitting antenna of the receiver according to the uplink-downlink channel symmetry of a Time Division Duplex (TDD) system, make up channel vectors of antennas of the receiver by using the downlink channel vector corresponding to the transmitting antenna of the receiver and the calculated downlink channel vector corresponding to the non-transmitting antenna of the receiver; and perform Singular Value Decomposition (SVD) for the channel vectors of the antennas of the receiver to determine a best transmitting precoding matrix.

8. The communication system of claim 7, wherein the base station comprises:
a first downlink channel vector calculating unit corresponding to transmitting antenna of the receiver, the first downlink channel vector calculating unit configured to measure an uplink channel vector from the transmitting antenna of the receiver to the base station, and regard the uplink channel vector as a downlink channel vector corresponding to the transmitting antenna of the receiver according to uplink-downlink channel symmetry of the TDD system;

a second downlink channel vector calculating unit corresponding to non-transmitting antenna of the receiver, a second downlink channel vector calculating unit configured to receive the index of the codebook element, wherein the codebook element refers to a codebook element whose correlation value has a greatest modulus value among correlation values that are calculated by the receiver and are about correlation between the codebook element and the downlink channel corresponding to the non-transmitting antenna of the receiver; and calculate a downlink channel vector corresponding to the non-transmitting antenna of the receiver according to the index of the codebook element; and a unit for determining a best transmitting precoding matrix, the unit configured to perform SVD by using the downlink channel vectors of antennas of the receiver to determine the best transmitting precoding matrix, wherein the downlink channel vectors of the antennas of the receiver are composed of the downlink channel vector corresponding to the non-transmitting antenna of the receiver and the downlink channel vector corresponding to the transmitting antenna of the receiver.

9. The communication system of claim 8, wherein the first downlink channel vector calculating unit is configured to calculate the downlink channel vector corresponding to the non-transmitting antenna of the receiver through a Constraint Maximum Likelihood (CML) estimation method.

10. The communication system of claim 7, wherein the receiver is a Minimum Mean Square Error (MMSE)-Bell-labs Layered Space Time (BLAST) receiver.

* * * * *